(12) United States Patent
Kuttenreich et al.

(10) Patent No.: US 12,163,804 B2
(45) Date of Patent: Dec. 10, 2024

(54) CAPTURE APPARATUS FOR A MOTOR VEHICLE FOR CAPTURING OBSTACLES BELOW A WATER SURFACE

(71) Applicant: MAN Truck & Bus SE, Munich (DE)

(72) Inventors: Fabian Kuttenreich, Munich (DE); Sven Kraus, Munich (DE)

(73) Assignee: MAN Truck & Bus SE, Munich (DE)

( * ) Notice: Subject to any disclaimer, the term of this patent is extended or adjusted under 35 U.S.C. 154(b) by 437 days.

(21) Appl. No.: 17/764,803

(22) PCT Filed: Sep. 23, 2020

(86) PCT No.: PCT/EP2020/076507
§ 371 (c)(1),
(2) Date: Mar. 29, 2022

(87) PCT Pub. No.: WO2021/063761
PCT Pub. Date: Apr. 8, 2021

(65) Prior Publication Data
US 2022/0333923 A1 Oct. 20, 2022

(30) Foreign Application Priority Data
Sep. 30, 2019 (DE) ...................... 10 2019 006 804.1

(51) Int. Cl.
*G01C 7/04* (2006.01)
*B60W 40/06* (2012.01)
(Continued)

(52) U.S. Cl.
CPC ............... *G01C 7/04* (2013.01); *B60W 40/06* (2013.01); *B60W 50/16* (2013.01);
(Continued)

(58) Field of Classification Search
CPC .................................. G01C 7/04; G01C 13/008
(Continued)

(56) References Cited

U.S. PATENT DOCUMENTS 4,653,316 A * 3/1987 Fukuhara ................. G01C 7/04
73/146
4,858,329 A * 8/1989 Manor ..................... G01B 7/28
33/1 H
(Continued)

FOREIGN PATENT DOCUMENTS

CN 101549691 A 10/2009
CN 103158797 B 9/2015
(Continued)

OTHER PUBLICATIONS

German Search Report issued in German Patent Application No. 102019006804.1 dated Apr. 24, 2020. English translation not available.
(Continued)

*Primary Examiner* — George B Bennett
(74) *Attorney, Agent, or Firm* — Weber Rosselli & Cannon LLP (57) ABSTRACT

A detection device configured to be arranged on a motor vehicle includes at least one bracket construction for mounting on a front of the motor vehicle. The at least one bracket construction has at least one detection element for detecting a road topography in the direction of travel in front of the motor vehicle under a water surface to detect obstacles or a water depth.

20 Claims, 6 Drawing Sheets

(51) Int. Cl.
*B60W 50/16* (2020.01)
*G01C 13/00* (2006.01)
*B60W 50/14* (2020.01)

(52) U.S. Cl.
CPC ..... *G01C 13/008* (2013.01); *B60W 2050/143* (2013.01); *B60W 2050/146* (2013.01); *B60W 2300/105* (2013.01); *B60W 2300/362* (2013.01); *B60W 2555/20* (2020.02)

(58) Field of Classification Search
USPC .......................................................... 33/521
See application file for complete search history.

(56) References Cited

U.S. PATENT DOCUMENTS

| | | | | |
|---|---|---|---|---|
| 5,029,194 | A * | 7/1991 | Young | G01K 11/24 |
| | | | | 850/62 |
| 5,631,732 | A * | 5/1997 | Schrum, Jr. | G01C 1/02 |
| | | | | 73/146 |
| 6,198,386 | B1 * | 3/2001 | White, II | H04N 7/181 |
| | | | | 348/E7.086 |
| 6,782,631 | B1 * | 8/2004 | Face, III | G01C 7/04 |
| | | | | 33/501.02 |
| 7,937,246 | B2 * | 5/2011 | Farritor | G01P 15/00 |
| | | | | 356/614 |
| 9,026,310 | B2 * | 5/2015 | Tran | G06F 7/00 |
| | | | | 367/908 |
| 9,227,479 | B2 * | 1/2016 | Clarke | B60W 30/18009 |
| 9,404,738 | B2 * | 8/2016 | Toom | G01B 5/285 |
| 10,300,852 | B2 * | 5/2019 | Cund | G01F 23/2928 |
| 10,698,412 | B2 * | 6/2020 | Loosararian | G01B 7/105 |
| 11,284,555 | B2 * | 3/2022 | Smith | G01C 9/00 |
| 11,297,758 | B2 * | 4/2022 | Johnson | A01D 34/008 |
| 11,347,222 | B2 * | 5/2022 | Pelin | G01C 13/008 |
| 2024/0004062 | A1 * | 1/2024 | Davis | G01S 7/524 |

FOREIGN PATENT DOCUMENTS

| | | |
|---|---|---|
| CN | 108001446 A | 5/2018 |
| DE | 102012004198 A1 | 10/2012 |
| DE | 102018112269 A1 | 11/2018 |

OTHER PUBLICATIONS

International Search Report with English Translation and Written Opinion issued in PCT/EP2020/076507 dated Jan. 11, 2021.
First Examination Opinion Notice issued in Chinese Application No. 202080068535.6 dated May 21, 2024 with English translation.

* cited by examiner

CAPTURE APPARATUS FOR A MOTOR VEHICLE FOR CAPTURING OBSTACLES BELOW A WATER SURFACE

CROSS-REFERENCE TO RELATED APPLICATIONS

This application is a U.S. National Stage Entry filed under 35 U.S.C. § 371 of International Application No. PCT/EP2020/076507, filed on Sep. 23, 2020, which claims the benefit of, and priority to, German Patent Application No. DE 10 2019 006 804.1, filed on Sep. 30, 2019, the entire content of each of which is incorporated by reference herein.

BACKGROUND

Technical Field

The present disclosure relates to a capture apparatus to be arranged on a motor vehicle, and in particular, a scanning apparatus, to be arranged on a motor vehicle.

Background of Related Art

Emergency vehicles for catastrophe regions, in particular for use in flooded regions, are known in the prior art in greatly differing embodiments. In floods, emergency vehicles often have to drive (ford) through deep water. Obstacles located in front of the emergency vehicles in the travel direction and below a water surface (e.g., bollards, debris, curb stones, flotsam, manholes exposed due to washed-away manhole covers, etc.) are usually not recognizable to the vehicle driver through the generally turbid water and therefore represent a source of hazard for the emergency vehicles.

SUMMARY

In accordance with an aspect of the present disclosure, a capture apparatus is arranged on a front of a motor vehicle, such as a utility vehicle, having at least one holding structure to be mounted on the motor vehicle. The at least one holding structure includes at least one capture element to capture a roadway topography located in front of the motor vehicle in the travel direction and below a water surface, for example, to capture a water depth (in particular fording depth) and/or in particular obstacles having abrupt elevations and/or abrupt depressions.

One object of the present disclosure is to provide an option by means of which the safety of motor vehicles used in flooded regions can be increased.

This object can be achieved by the features of the main claim. Refinements are disclosed in the dependent claims or result from the following description of embodiments of the present disclosure.

The present disclosure relates to a capture apparatus, in particular a scanning apparatus, to be arranged on a motor vehicle, and in embodiment, on a motor vehicle front of a motor vehicle, such as a utility vehicle or emergency vehicle, having at least one holding structure to be mounted on the motor vehicle front.

The capture apparatus includes at least one holding structure that has at least one capture element (such as a scanning element) to capture (e.g., to scan) a roadway topography located in front of the motor vehicle in the travel direction (for example up to 4 m, up to 3.5 m, or up to 3 m) and below a water surface, for example, so that obstacles and/or a water depth (such as the maximum) can be captured.

In embodiments, the at least one capture element may be designed to roll on the roadway topography (e.g., in a contact-based manner) and/or to roll over the obstacles (e.g., in a contact-based manner), for example, to climb over the obstacles (e.g., in a contact-based manner).

In aspects, the capture element may capture the roadway topography by means of ground contact and therefore expediently to scan it.

The roadway topography can include, for example (in aspect, abrupt) obstacles.

The obstacles can include, for example, depressions (e.g., manholes open due to washed away manhole covers, curbstone edges, etc.) and/or elevations (e.g., bollards, debris, boulders, curbstone edges, flotsam, etc.).

The at least one capture element can include, for example, a rotatable scanning wheel, a rotatable star wheel or an expediently rotatable capture wheel.

The star wheel can include, for example, at least three scanning wheels, and in embodiments, at least three satellite scanning wheels.

The star wheel can include, for example, at least three expediently rotatable scanning arms each having a scanning wheel. The scanning arms can form, for example, an expediently central rotating structure for the scanning wheels.

In aspects, the star wheel, and in embodiments, the scanning wheels and/or the scanning arms, may be rotatable around a central axis of rotation.

The star wheel can be referred to, for example, as a scanning revolver.

The at least one capture element can also be an expediently rotatable capture wheel having, for example, essentially circular ground contact surface.

The at least one capture element can include, for example, a rotatable scanning sphere.

In embodiments, the scanning sphere may be housed in sections in a sphere housing and/or is rotatably mounted therein.

In aspects, the scanning sphere can be freely rotatable, for example, in order to build up essentially no lateral forces when cornering (e.g., because it can in particular steer along inherently with the motor vehicle) and/or to be able to roll in all (travel) directions.

In certain aspects, the scanning sphere can roll freely (e.g., freely rotatable) in one plane (e.g., horizontal) and/or around all three spatial axes, so that the scanning sphere builds up essentially no lateral forces, for example, when cornering (e.g., because it can in particular steer along inherently with the motor vehicle).

In embodiments, the contact surface of the scanning sphere may be less than or equal to the contact surface of the tires of the front wheels of the motor vehicle.

The at least one holding structure can include, for example, at least one damper for reducing a capture momentum, for example, when capturing the roadway topography, and in embodiments, when capturing a particularly abrupt obstacle. Capture momentum can be damped thereby and thus reduced in the event of a collision with particularly solid and/or large obstacles.

In aspects, the at least one capture element can be arranged essentially at the distal end of the at least one holding structure.

In other aspects, the at least one holding structure may have a first (for example bar-shaped) support element and a second (for example bar-shaped) support element, which can be connected to one another by means of a pivot joint, for example, to enable a deflection of the second support element in dependence on the roadway topography, and in embodiments, to enable a deflection in the upward and downward direction.

The first support element and the second support element can form, for example, a bow structure and/or linkage structure.

In aspects, the second support element may extend essentially diagonally upward in the direction of the at least one capture element and/or a central axis of rotation of the at least one capture element is arranged on a higher level than the pivot joint.

A deflection of the at least one holding structure, and in embodiments, of the second support element, when climbing over obstacles can thus be facilitated.

The at least one holding structure and/or the at least one capture element can, for example, be steerable, for example, around a steering axis extending essentially perpendicular to the axis of rotation.

The at least one holding structure and/or the at least one capture element can be designed, for example, to be able to be steered together with the motor vehicle.

Wear of the at least one capture element caused by steering actions of the motor vehicle can thus be reduced and/or the maneuverability of the motor vehicle equipped with the capture apparatus can be improved.

In certain aspects, the capture apparatus may have at least two holding structures, which, in embodiments, are arranged adjacent to one another and/or extend essentially in parallel to one another.

In embodiments, the capture apparatus may have at least one trap element for capturing obstacles having elevations between the at least two holding structures.

The trap element thus forms an additional capture element for obstacles located under the water surface, which in embodiments, may be elevations.

In aspects, the trap element may be an essentially limp (for example yielding or flexible) trap element and/or a trap element to engage with obstacles having elevations.

The trap element can be, for example, a tensile cord, such as a trap line, a trap band, or a trap chain, etc.

The trap element can, for example, connect the at least two holding structures to one another.

The trap element can extend, for example, essentially transversely to the at least two holding structures.

In embodiments, the capture apparatus may have at least one display structure optically recognizable to a vehicle driver of the motor vehicle.

In aspects, the display structure may be designed to be moved in dependence on the roadway topography captured (e.g., by means of the at least one capture element and/or by means of the trap element), so that, for example, the movement of the display structure can supply items of information to the vehicle driver about the upcoming roadway topography.

In other aspects, the display structure may be designed to protrude out of the water surface and can comprise, for example, an essentially vertical rod, etc.

The display structure, and in embodiments, the rod, can also be set into motion by the movements generated by means of the at least one capture element and/or by means of the trap element.

The capture apparatus can include, for example, a capture sensor system (for example one or more sensors), to capture the roadway topography captured by the at least one capture element and/or the protrusion captured by the trap element, which in embodiments, may be captured electronically.

In embodiments, the capture sensor system may be designed to transmit the roadway topography captured by the at least one capture element and/or the protrusion captured by the trap element in the form of a data packet to, for example, a control unit (for example computer unit, data processing apparatus, etc.).

In embodiments, the control unit can control, and in embodiments, brake, the motor vehicle in dependence on the data packet and in embodiments, in dependence on the captured roadway topography (e.g., the obstacles).

In aspects, the control unit can transmit the data packet and thus the captured roadway topography (e.g., the obstacles) to other motor vehicles.

In other aspects, the control unit can generate an acoustic, haptic, and/or optical warning message for the vehicle driver in dependence on the data packet and in embodiments, in dependence on the captured roadway topography (e.g., the obstacles).

In embodiments, the present disclosure relates to a motor vehicle, for example a utility vehicle or emergency vehicle, having a capture apparatus as disclosed herein.

In aspects, the motor vehicle may include at least two steerable front wheels and a holding structure in each case, which is arranged essentially directly in the forward motion of each front wheel, and, for example, at least one further holding structure, which is arranged in between.

In other aspects, the at least one steerable holding structure and/or the at least one steerable capture element can execute a synchronous steering process together with the steerable front wheels.

In embodiments, the scanning or capture wheel can include relatively wide wheel structures and thus, for example, also scanning rollers, etc.

In aspects, the motor vehicle can include a display, which may be electronic, to display the captured roadway topography, which in embodiments, may include the elevations captured, for example, by the trap element.

In embodiments, the roadway topography can include a road and/or terrain surface, e.g., roads, debris fields, terrain, and/or other ground or terrain surfaces, etc.

The above-described embodiments and features of the present disclosure can be combined with one another arbitrarily. Other aspects of the present disclosure are disclosed in the dependent claims or result from the following description in conjunction with the appended figures.

BRIEF DESCRIPTION OF THE DRAWINGS

Various aspects and features of the present disclosure are described below with reference to the appended drawings, in which:

The embodiments described with reference to the figures partially correspond, wherein similar or identical parts are provided with the same reference signs and reference can also be made to the description of the other embodiments for their explanation.

Figure 1:
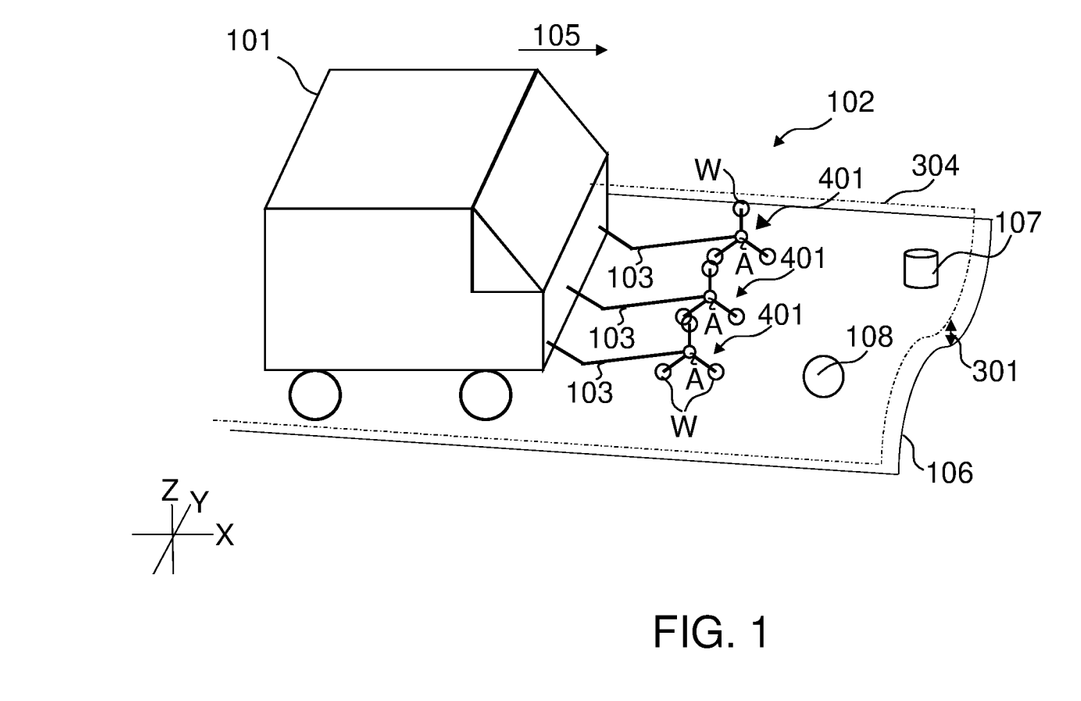
FIG. 1 shows a schematic illustration of a motor vehicle having a capture apparatus according to one embodiment of the present disclosure.

FIG. 1 shows a motor vehicle 101, which in embodiments may be for use in flooded regions or for fording journeys. The motor vehicle 101 therefore typically has to drive (ford) through deep water in use.

Reference sign 106 identifies a roadway topography having obstacles 107 and 108, which may be abrupt, under a water surface 304 and are thus generally not visible to the vehicle driver. The obstacles 107 and 108 can include, for example, an abrupt elevation 107 (e.g., bollards, debris, flotsam, etc.) and an abrupt depression 108 (e.g., holes, exposed manholes, etc.). The obstacles 107, 108 represent potential sources of hazard for the motor vehicle 101, which are usually not recognizable to the vehicle driver, however.

Therefore, the motor vehicle 101 includes a capture apparatus 102, such as a scanning apparatus for scanning the roadway topography 106 having the obstacles 107 and 108.

The capture apparatus 102 includes, for example, three holding structures 103 arranged adjacent to one another and extending essentially in parallel to one another to be mounted on the vehicle front of the motor vehicle 101.

Each of the holding structures 103 includes a capture element 401 for capturing the roadway topography 106, 107, 108 located in front of the motor vehicle 101 in the travel direction 105 and below the water surface 304, so that by means of the capture elements 401, the obstacles 107 and 108, but alternatively or additionally also the water depth 301 can be captured.

The capture elements 401 are essentially arranged at the distal end of the holding structures 103 and are designed as a rotatable star wheel having three scanning arms and three scanning wheels W. The three scanning arms and the three scanning wheels W are rotatable around a central axis of rotation A. The capture element designed as a star wheel 401 can also be referred to as a scanning revolver.

The capture elements 401 are designed to roll (in a contact-based manner) on the roadway topography 106, 107, and 108 and in embodiments, to roll (in a contact-based manner) over the obstacles 107 and 108, and in other embodiments, to climb over the obstacles 107 and 108.

In embodiments, the roadway topography 106 including the obstacles 107 and 108 is captured by direct ground contact.

The capture apparatus 102 is used to capture a roadway topography 106, 107, 108 located, for example, up to approximately 4 m or up to approximately 3 m in front of the motor vehicle 101.

The motor vehicle 101 includes two steerable front wheels, wherein one holding structure 103 is arranged in each case essentially directly in the forward motion of each front wheel and a further holding structure 103 is arranged in between.

The holding structures 103 and/or the capture elements 401 can be designed to be steerable, and in embodiments, to be able to be steered along matched with the steerable front wheels of the motor vehicle 101. Wear of the capture elements 401 can thus be reduced and the maneuverability of the motor vehicle 101 including capture apparatus 102 can be improved. One possible implementation for the steerability is, for example, a rotatable mounting of the capture elements 102 essentially perpendicular to the central axis of rotation A.

The capture elements 401 designed as star wheels may be designed so that they can plunge into a manhole exposed due to a washed away manhole cover, but not disappear completely therein, and in embodiments, not fall therein.

Figure 2:
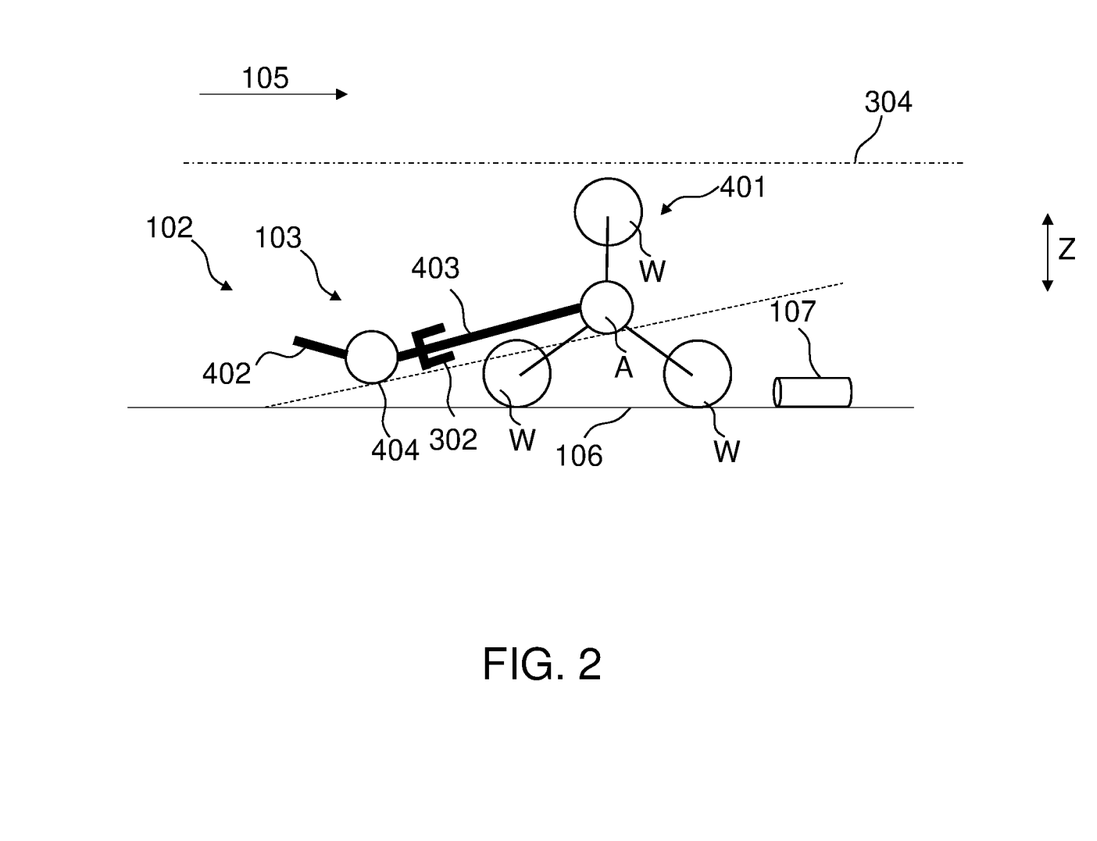
FIG. 2 shows a schematic illustration of a capture apparatus according to another embodiment of the present disclosure.

FIG. 2 shows a schematic illustration of a capture apparatus 102 according to another embodiment of the present disclosure.

The holding structure 103 includes a first support element 402 and a second support element 403, which form a bow structure or linkage structure and are connected to one another by means of a pivot joint 404. The second support element 403 extends diagonally upward in the direction of the capture element 401. A deflection of the second support element 403 in dependence on the roadway topography 106, 107, 108 can thus be enabled, and in embodiments, a deflection essentially in the upward and downward direction Z. The capture elements 401 can thus more easily roll over (e.g., more easily climb over) elevations 107. The central axis of rotation A of the capture element 401 may be arranged on a higher level than the pivot joint 404.

The holding structure 103 has a damper 302 for reducing a capture momentum (for example a shock), so that the capture momentum during the capture of an obstacle 107 and 108 can be reduced, which can be advantageous, for example, in the case of collisions with relatively large obstacles 107 and 108.

Figure 3:
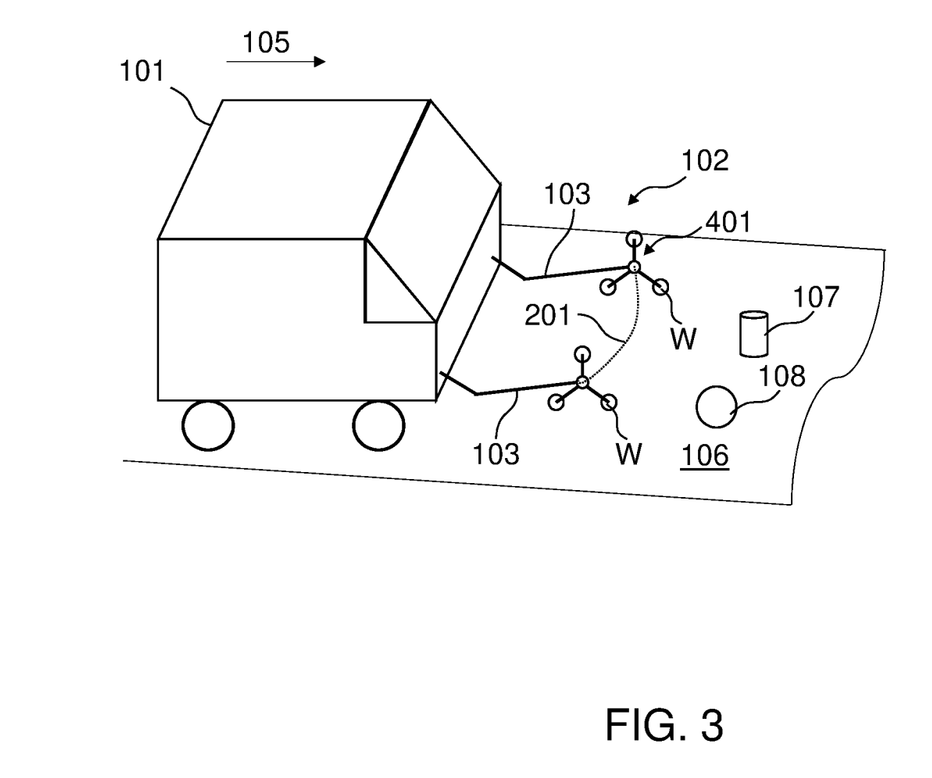
FIG. 3 shows a schematic illustration of a motor vehicle having a capture apparatus according to one embodiment of the present disclosure.

FIG. 3 shows a schematic illustration of a motor vehicle 101 having a capture apparatus 102.

In embodiments, the capture apparatus 102 shown in FIG. 3 may include a trap element 201 that extends between two external holding structures 103.

The trap element 201 is used as an additional capture element for capturing elevations 107 between the two external holding structures 103. The trap element 201 is made yielding or flexible and can be, for example, a trap chain, a trap line, a trap band, etc. Alternatively or additionally, it can be mounted in a yielding or flexible manner.

The trap element 201 extends essentially transversely to the two holding structures 103 and connects the two holding structures 103 to one another, to thus also be able to capture the space between the two holding structures 103.

Figure 4:
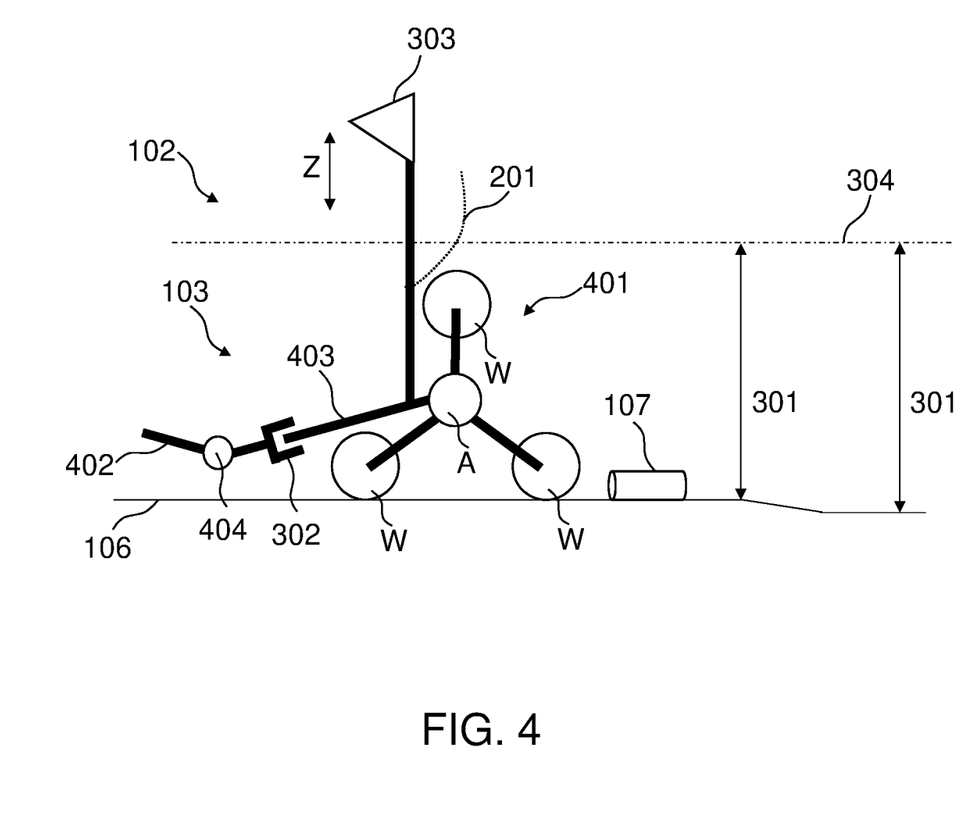
FIG. 4 shows a schematic illustration of a capture apparatus according to another embodiment of the present disclosure.

FIG. 4 shows a schematic illustration of a capture apparatus 102 according to another embodiment of the present disclosure.

In embodiments, the capture apparatus 102 shown in FIG. 4 may include a holding structure 103 that is equipped with a mechanical display structure 303 optically recognizable to a vehicle driver of the motor vehicle 101.

The display structure 303 may be mounted on the second support element 403 and is designed to protrude out of the water surface 304 and to be moved in dependence on the captured roadway topography 106, 107, 108, so that the vehicle driver receives items of information about the roadway topography 106, 107, and 108 under the water surface 304, which is not directly visible to him, by means of the movements of the display structure 303. The display structure 303 can include, for example, a flexible rod which is essentially vertical in the case of level roadway topography 106 having, for example, a flag etc.

It is possible that the trap element 201 is expediently connected to the display structure 303, (for example is mounted on its rod), so that the display structure 303 is also moved inward and/or backward, for example, when the trap element 201 captures an elevation 107.

The display structure 303 can moreover be used as a display for the water depth 301.

Abrupt sinking of multiple holding structures 103 and thus multiple display structures 303 is an indication of a relatively large abrupt depression 108. Abrupt sinking, for example, of only a single holding structure 103 and thus only a single display structure 303 is an indication of a relatively small depression 108 (for example an exposed manhole, etc.).

Figure 5:
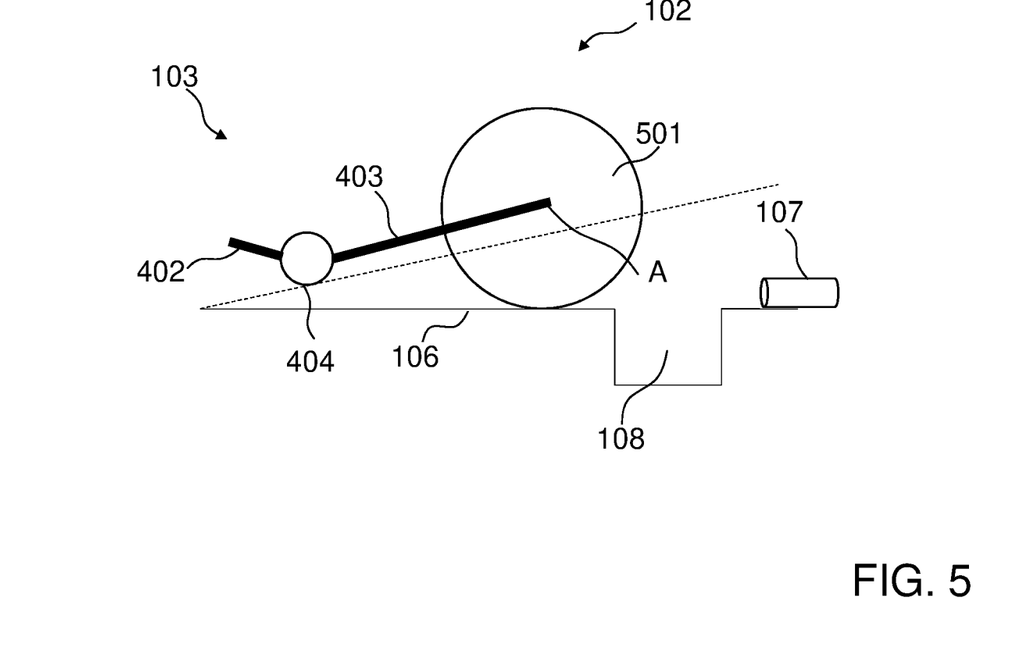
FIG. 5 shows a schematic illustration of a capture apparatus according to a further embodiment of the present disclosure.

FIG. 5 shows a schematic illustration of a capture apparatus 102 according to another embodiment of the present disclosure.

In embodiments, the capture element may be designed as a scanning wheel 501 rotatable around a central axis of rotation A. It is contemplated that the outer circumference of the capture element may be designed as the scanning wheel 501 to correspond essentially at most to the outer circumference of the front wheels of the motor vehicle 101.

Figure 6:
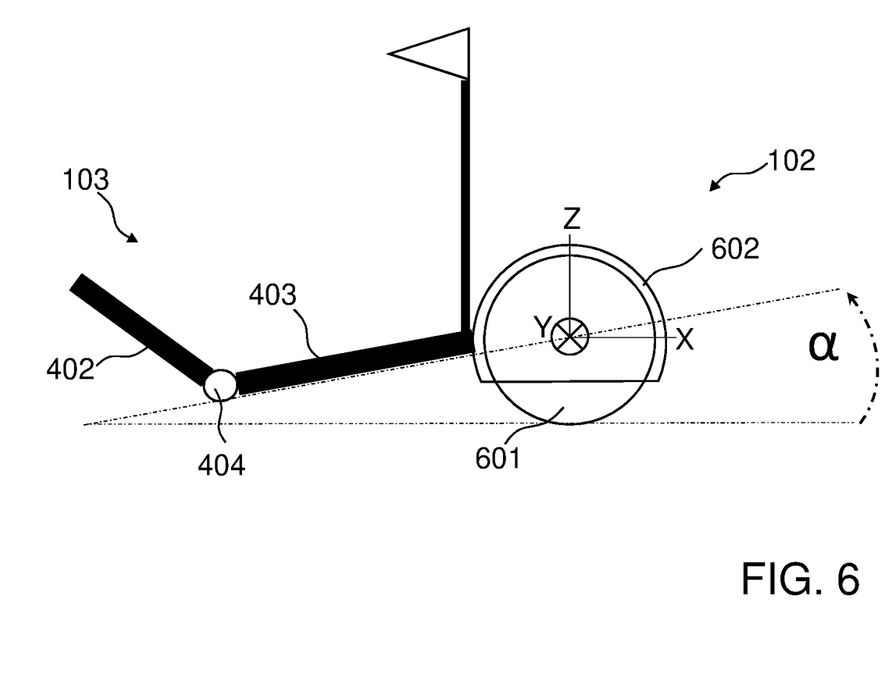
FIG. 6 shows a schematic illustration of a capture apparatus according to another embodiment of the present disclosure.

FIG. 6 shows a schematic illustration of a capture apparatus 102 according to another embodiment of the present disclosure.

In embodiments, the capture element may be designed as a scanning sphere 601, which is freely rotatable in particular. The scanning sphere 601 is housed in sections in a sphere cage 602 and is expediently mounted therein.

The rotatable scanning sphere 601 can roll freely in the plane X, Y and is freely rotatable around all three spatial axes X, Y, Z, so that it essentially does not build up lateral forces, for example, when cornering, because it is inherently steering along with the motor vehicle 101.

It is to be noted that the contact surface of the scanning sphere 601 is smaller than or essentially equal to the contact surface of the tires of the front wheels of the motor vehicle 101.

The capture apparatus 102 described with reference to FIGS. 1 to 6 can include a capture sensor system (for example one or more sensors), which may be electronic.

The capture sensor system can be designed to capture the roadway topography 106, 107, 108 captured by means of the capture elements 401, 501, and 601 and/or the elevations 107 captured by means of the trap element 201 electronically and thus automatically to transmit them in the form of a data packet to a control unit. For this purpose, for example, one or more sensors can be integrated into the holding structures 103 or attached to the damper 303.

It can thus be enabled, for example, that the motor vehicle 101 is controlled, and in embodiments, braked, in dependence on the data packet.

It can also thus be enabled that the data packet can be transmitted, for example, to other motor vehicles. Items of information about hazardous areas can thus be communicated with other motor vehicles.

It can thus furthermore be enabled that in dependence on the data packet an acoustic (for example warning tone), haptic (for example steering wheel vibration), and/or optical warning message (for example signal light) is generated for the vehicle driver. For this purpose, for example, the movements of the display structure 303, and in embodiments, in particular movements of the rod out of an essentially vertical alignment, can be captured and expediently evaluated.

The capture apparatus 102 can also be used for mapping roadway topography 106 located under a water surface 304. For this purpose, for example, a rotational angle sensor can be integrated into one or more holding structures 103.

The invention is not restricted to the above-described embodiments. Rather, a variety of variants and modifications is possible, which also make use of the concepts of the present disclosure and therefore fall in the scope of protection. In addition, the present disclosure also claims protection for the subject matter and the features of the dependent claims independently of the features and claims referred to.

LIST OF REFERENCE SIGNS 101 motor vehicle, for example emergency vehicle or utility vehicle
102 capture apparatus, preferably scanning apparatus
103 holding structure
105 travel direction of the motor vehicle
106 roadway topography
107 obstacle, in particular elevation
108 obstacle, in particular depression
201 trap element, preferably additional capture element
301 water depth
302 damper
303 display structure
304 water surface
401 capture element, in particular star wheel
501 capture element, in particular scanning wheel
601 capture element, in particular scanning sphere
602 sphere cage
402 first support element
403 second support element
404 pivot joint
A axis of rotation, in particular central axis of rotation
W scanning wheels
X spatial axis
Y spatial axis
Z spatial axis, upward and downward direction

What is claimed is:

1. A capture apparatus configured to be arranged on a motor vehicle, comprising:
at least one holding structure for mounting on a front of the motor vehicle, the at least one holding structure including:
at least one capture element for capturing a roadway topography located in front of the motor vehicle in the travel direction and below a water surface, to capture obstacles or a water depth.

2. The capture apparatus as claimed in claim 1, wherein the at least one capture element is configured to roll on the roadway topography or to roll over the obstacles.

3. The capture apparatus as claimed in claim 2, wherein the roadway topography has obstacles including elevations or depressions.

4. The capture apparatus as claimed in claim 3, wherein the at least one capture element includes a scanning wheel, a rotatable star wheel, or a rotatable capture wheel.

5. The capture apparatus as claimed in claim 4, wherein the star wheel includes at least three scanning wheels or at least three scanning arms.

6. The capture apparatus as claimed in claim 5, wherein the at least one capture element includes a rotatable scanning sphere housed in sections in a sphere housing.

7. The capture apparatus as claimed in claim 6, wherein the scanning sphere is freely rotatable, can roll freely in a plane, or can roll freely around all three spatial axes in order to build up essentially no lateral forces when cornering.

8. The capture apparatus as claimed in claim 7, wherein the at least one holding structure includes at least one damper for reducing a capture momentum when capturing an obstacle.

9. The capture apparatus as claimed in claim 8, wherein the at least one capture element is disposed at the distal portion of the at least one holding structure.

10. The capture apparatus as claimed in claim 9, wherein the at least one holding structure has a first support element and a second support element, which are connected to one another by means of a pivot joint to enable a deflection of the second support element in dependence on the roadway topography to enable a deflection essentially in the upward and downward direction.

11. The capture apparatus as claimed in claim 10, wherein the second support element extends upward in the direction of the at least one capture element or a central axis of rotation of the at least one capture element is arranged on a higher level than the pivot joint.

12. The capture apparatus as claimed in claim 11, wherein the at least one holding structure or the at least one capture element is steerable in order to be steerable together with the motor vehicle.

13. The capture apparatus as claimed in claim 12, wherein the capture apparatus has at least two holding structures, which are arranged adjacent to one another or extend in parallel to one another.

14. The capture apparatus as claimed in claim 13, wherein the capture apparatus has at least one trap element for capturing obstacles including elevations between the at least two holding structures, wherein the trap element connects the at least two holding structures to one another, or extends essentially transversely to the at least two holding structures, or is made yielding or flexible.

15. The capture apparatus as claimed in claim 14, wherein the at least one holding structure includes at least one display structure optically recognizable to a vehicle driver of the motor vehicle and the display structure is moved in dependence on the captured roadway topography, wherein the display structure is configured to protrude out of the water surface.

16. The capture apparatus as claimed in claim 15, wherein the capture apparatus further comprises a capture sensor system to electronically capture the roadway topography captured by the at least one capture element or the elevations captured by the trap element or transmit the roadway topography or elevations captured by the trap element in the form of a data packet to a control unit.

17. The capture apparatus as claimed in claim 16, wherein the control unit is configured to control or brake the motor vehicle in dependence on the data packet, or to transmit the data packet to other motor vehicles, or to generate an acoustic, haptic, or optical warning message for the vehicle driver in dependence on the data packet.

18. A motor vehicle, comprising:
a capture apparatus configured to be arranged on a motor vehicle, the capture apparatus including at least one holding structure for mounting on the motor vehicle, the at least one holding structure including:
at least one capture element for capturing a roadway topography located in front of the motor vehicle in the travel direction and below a water surface, to capture obstacles or a water depth,
wherein the motor vehicle is a utility vehicle or an emergency vehicle.

19. The motor vehicle as claimed in claim 18, wherein the motor vehicle further comprises:
at least two front wheels;
a first holding structure arranged essentially directly in the forward motion of each front wheel; and
a second holding structure arranged in between each front wheel.

20. The motor vehicle as claimed in claim 19, wherein the motor vehicle further comprises a display configured to display the captured roadway topography.

* * * * *